A. CALISI.
WAR CAR.
APPLICATION FILED JAN. 18, 1919.
1,307,238.
Patented June 17, 1919.
3 SHEETS—SHEET 1.
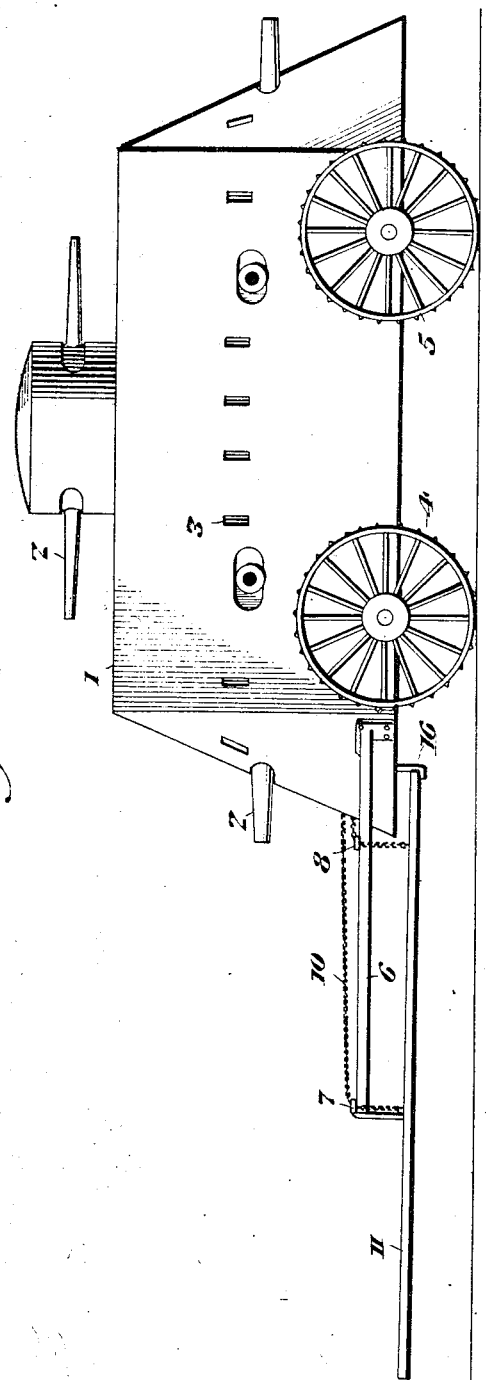
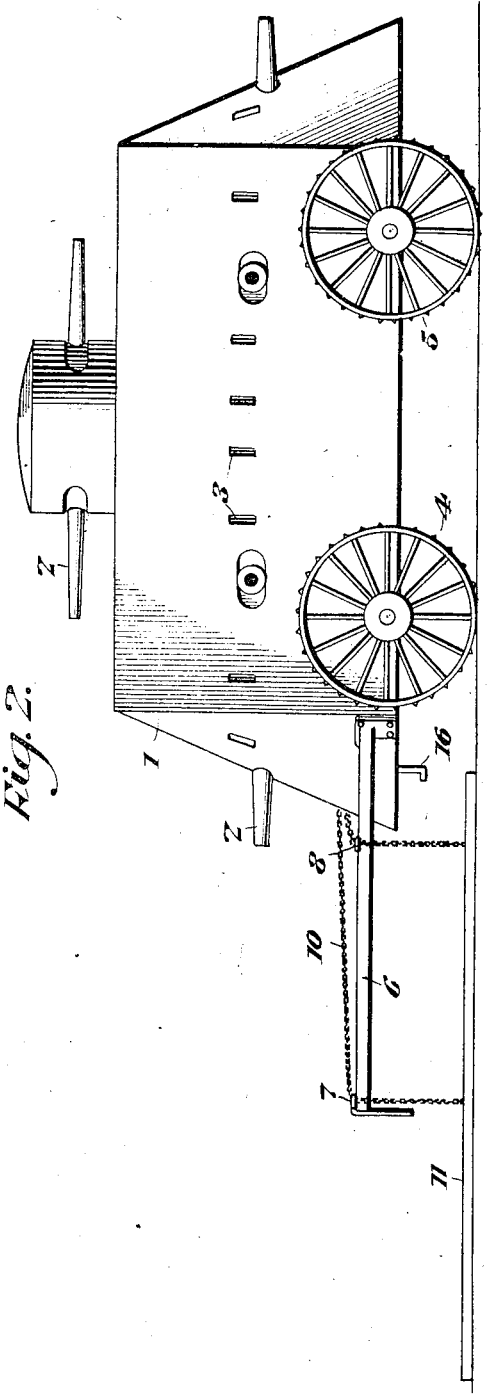
Witnesses
Inventor
Adriano Calisi
By Victor J. Evans
Attorney

A. CALISI.
WAR CAR.
APPLICATION FILED JAN. 18, 1919.

1,307,238.

Patented June 17, 1919.
3 SHEETS—SHEET 2.

Witnesses

Inventor
*Adriano Calisi*

By *Victor J. Evans*
Attorney

A. CALISI.
WAR CAR.
APPLICATION FILED JAN. 18, 1919.

1,307,238. Patented June 17, 1919.
3 SHEETS—SHEET 3.

Witnesses

Inventor
Adriano Calisi
By Victor J. Evans
Attorney

UNITED STATES PATENT OFFICE.

ADRIANO CALISI, OF WATERBURY, CONNECTICUT.

WAR-CAR.

1,307,238.  Specification of Letters Patent.  Patented June 17, 1919.

Application filed January 18, 1919. Serial No. 271,847.

*To all whom it may concern:*

Be it known that I, ADRIANO CALISI, a citizen of Italy, residing at Waterbury, in the county of New Haven and State of Connecticut, have invented new and useful Improvements in War-Cars, of which the following is a specification.

This invention relates to war cars, or as commonly called tanks, the object of the present invention being to produce an armored war car in the nature of a tank which is capable of making more rapid progress than the ordinary caterpillar tank now in use in Europe by the reason that it is mounted upon wheels driven by a motor convened within the body of the car.

One of the main objects of the present invention is to provide a car of the character above referred to which carries a pair of track rails, combined with means for shifting said rails, placing the same in position to receive and support the wheels of the car while passing over a trench or other excavation and subsequently restoring said track rails to their carrying position on the car.

With the above and other objects in view, the invention consists in the novel construction, combination and arrangement herein fully described, illustrated and claimed.

In the accompanying drawings:—

Figure 1 is a side elevation of the car or tank showing the track rails in their carrying positions.

Fig. 2 is a similar view showing the rails bound in position for use.

Figure 3:
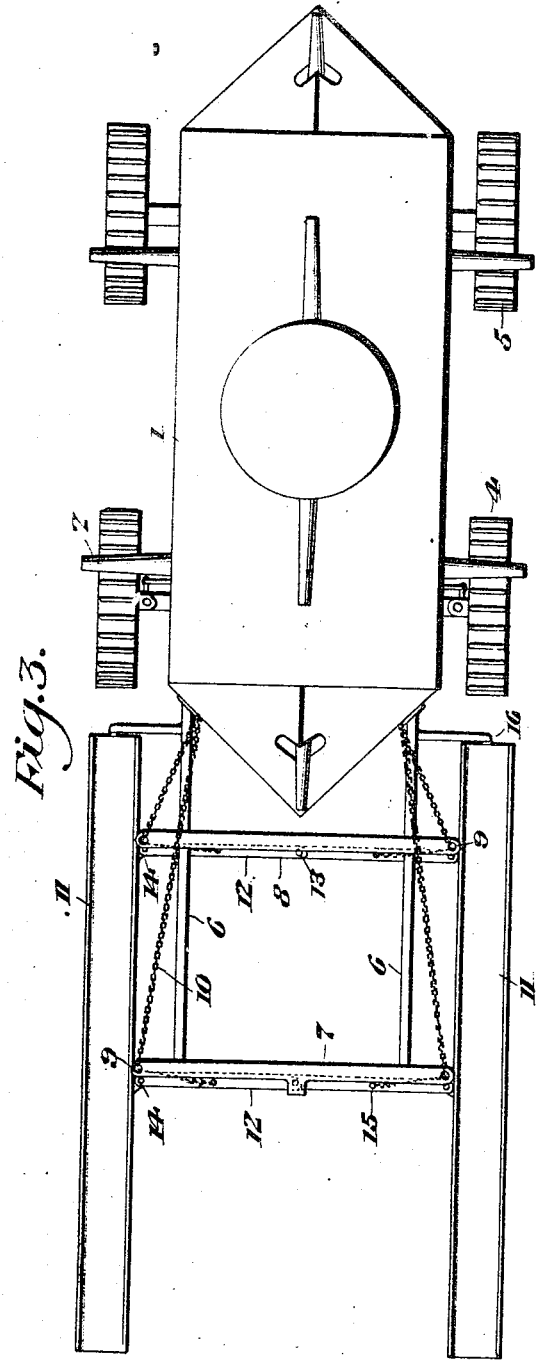
Fig. 3 is a plan view of the car showing the rails in their carrying position.

Referring to the drawings 1, designates an armored car carrying a series of guns or fire arms 2 and provided with suitable port holes or observation windows 3. The car as a whole is mounted upon carrying wheels 4 and 5 at the front and rear thereof and if desired all of said wheels may constitute the traction wheels of the car, the same being suitably geared to and driven by an engine 5 located within the body of the car.

Figure 4:
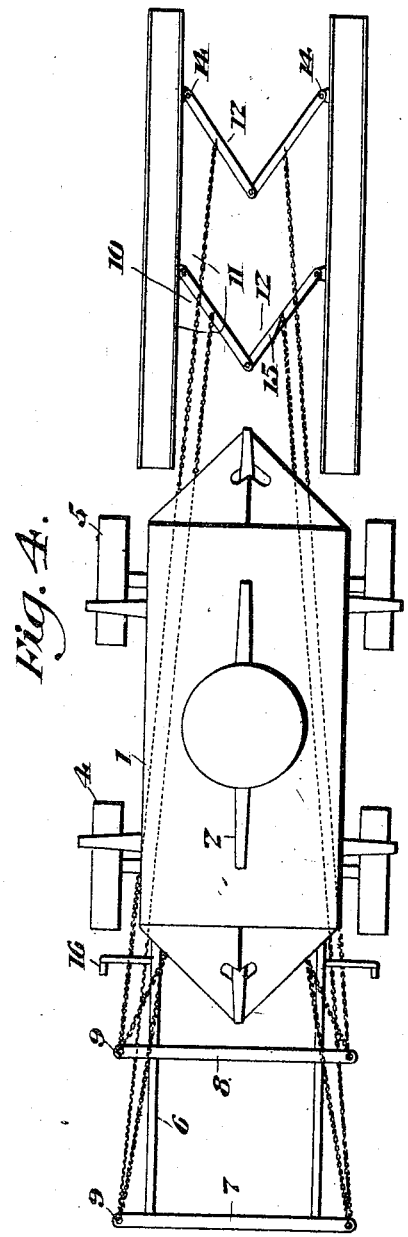
Fig. 4 is a diagrammatic plan view, showing the positions of the track rails after the wheels of the cars have passed over the same.
Figure 5:
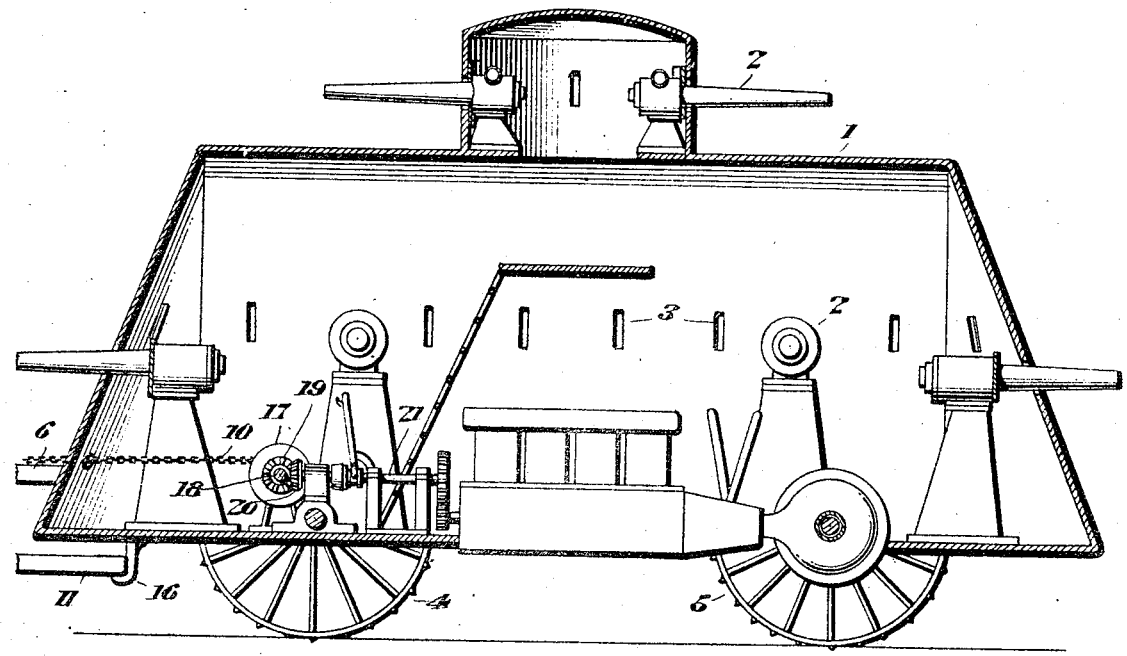
Fig. 5 is a vertical longitudinal section through the car showing the operating means.
Figure 6:
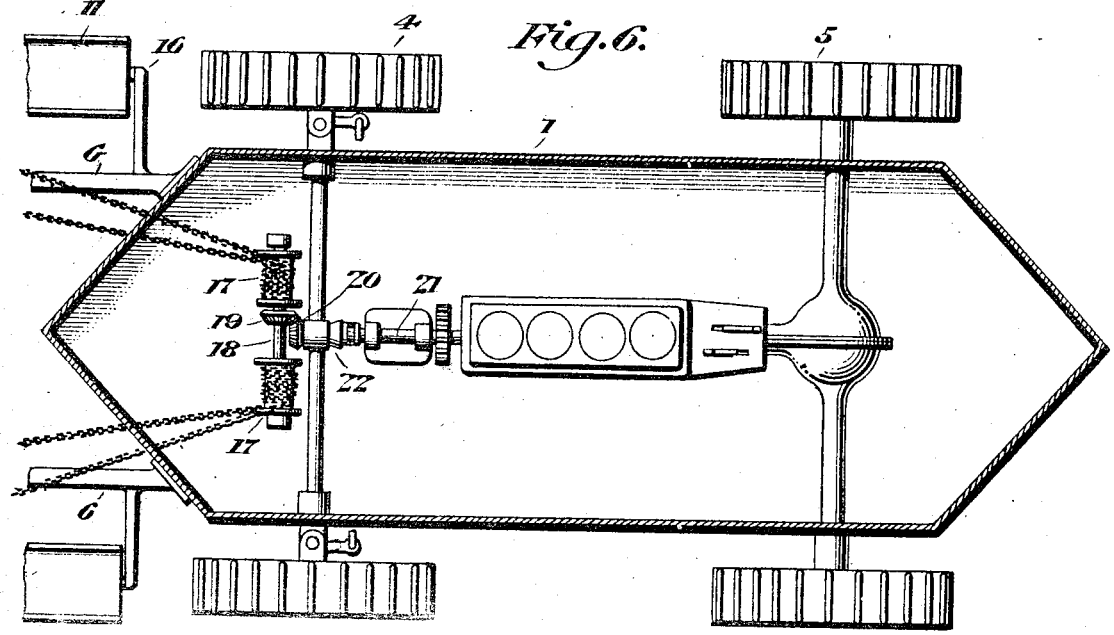
Fig. 6 is a horizontal section through the car showing the train operating means.

Extending forwardly from the front of the car are parallel supporting arms 6 having securely fastened thereto front and rear cross arms 7 and 8 having terminal eyes or guides 9 through which are passed flexible chains 10. The rear ends of said chain pass through openings in the front of the car and into the interior of the car while the forward extremities of said chains are passed to the track rails as will hereinafter appear. I employ two track rails 11 adapted to span a trench or other excavation and support the wheels 4 and 5 of the car while the latter is passing thereover. The rails 11 are connected by a series of toggle links 12, the latter being pivotally connected together at 13 and pivotally connected at 14 to the rails 11. The chains 10 are connected to the links 12 at the points 15 between the pivot points 13 and 14 so that after the car has passed over said track rails and a forward pull is given by the chains 10 on the track rails 11, the links 12 will serve to draw the rails 11 toward each other so that they may be thrown forward between the wheels 4 and 5 of the car. The arrangement last referred to is best illustrated in Fig. 4. When the track rails 11 are in their carrying position as shown in Fig. 1, the rearest extremities thereof are supported by hooks 16 secured to the front of the car 1. The rear ends of the chain 10 pass around brooms or pulleys 17 on a common transversely extending rotary shaft 18 connected by gears 19 and 20 to a shaft 21 extending longitudinally within the car and actuated by the engine 5 hereinabove referred to. The shaft 1 is of sectional construction and embodies the clutch 22 which may be used for the purpose of throwing the chains 10 into and out of operation said clutch being controlled by an operator within the car.

The operation of the mechanism is as follows: Upon arriving at a trench or other excavation, the car is stopped with the track rails 11 supported above the trench. The engine is then thrown in coöperative relation with the chains 10 and the latter are slacked until the track rails 11 rest upon the ground and bridge over the trench. The car is then driven over the rails, to move while additional slack is given to the chains 10. After the car passes off the ends of the rails the engine is used to rewind the chains 10 upon the drum 17. When said chains are thus pulled, the track rails 11 are first moved toward each other so as to clear the wheels 4 and 5 of the car and then both rails together are drawn forward until they rest under the supporting arms 6 upon a further winding of the chain, said track rails are raised and finally restored to their carrying positions as shown in Fig. 1. In view of the fact that the track rails only need be used in crossing trenches and other excavations, it will be understood that much more rapid progress may be made with the car than is possible with the well known caterpillar tank which is continuously laying and taking up its track and the life of which is comparatively short in view of the great number of pivotal connections between the links of the caterpillar track.

I claim:—

1. In a war car, a car body, supporting and driving wheels on which said body is mounted, track rails, supporting arms for said track rails, extending forwardly from the car body, flexible chains connected with said rails for shifting the latter into position to support the car wheels and subsequently into carrying position, and a motor in the car for operating said chains, said track rails being flexibly connected together for movement toward and away from each other.

2. In a war car, a car body, supporting and driving wheels on which said body is mounted, track rails, supporting arms for said track rails, extending forwardly from the car body, flexible chains connected with said rails for shifting the latter into position to support the car wheels and subsequently into carrying position, and a motor in the car for operating said chains, said track rails being flexibly connected together for movement toward and away from each other by means of toggle links, and the chains being attached to said links.

3. In a war car, a car body, supporting and driving wheels on which said body is mounted, track rails, supporting arms for said track rails, extending forwardly from the car body, flexible chains connected with said rails for shifting the latter into position to support the car wheels and subsequently into carrying position, a motor in the car for operating said chains, and guiding means for said chains on said supporting arms.

In testimony whereof I affix my signature.

ADRIANO CALISI.